United States Patent
Dewald

[11] Patent Number: 6,084,703
[45] Date of Patent: Jul. 4, 2000

[54] ILLUMINATION SYSTEM FOR HIGH RESOLUTION DISPLAY SYSTEMS

[75] Inventor: Duane Scott Dewald, Dallas, Tex.

[73] Assignee: Texas Instruments Incorporated, Dallas, Tex.

[21] Appl. No.: 09/228,811

[22] Filed: Jan. 11, 1999

Related U.S. Application Data

[60] Provisional application No. 60/071,243, Jan. 12, 1998.

[51] Int. Cl.[7] ............................................... G02B 26/00
[52] U.S. Cl. ...................... 359/290; 359/618; 359/629; 359/634; 362/268; 355/67
[58] Field of Search ........................ 359/618, 619, 359/626, 629, 634, 583, 290; 362/268; 355/67

[56] References Cited

U.S. PATENT DOCUMENTS 4,939,630  7/1990  Kikuchi et al. .................. 362/268
5,914,817  6/1999  Browning et al. .................. 359/634

OTHER PUBLICATIONS

Sony Corporation Brochure, 1998.

*Primary Examiner*—Loha Ben
*Attorney, Agent, or Firm*—Charles A. Brill; Wade James Brady, III; Frederick J. Telecky, Jr.

[57] ABSTRACT

An optical system for a spatial light modulator display system. The system includes a light integrator (20), the image of which is to be reproduced on at least one spatial light modulator (44). At least two vignetting apertures (24, 38) are used to frame light from said integrator (20), prior to reaching said modulator or modulators (44). The vignetting apertures (24, 38) reduce stray light and maintain uniformity and telecentricity of the system. This allows the system to use smaller optics for larger spatial light modulators that would normally require large optics, making the system cost prohibitive and of poor performance.

10 Claims, 1 Drawing Sheet

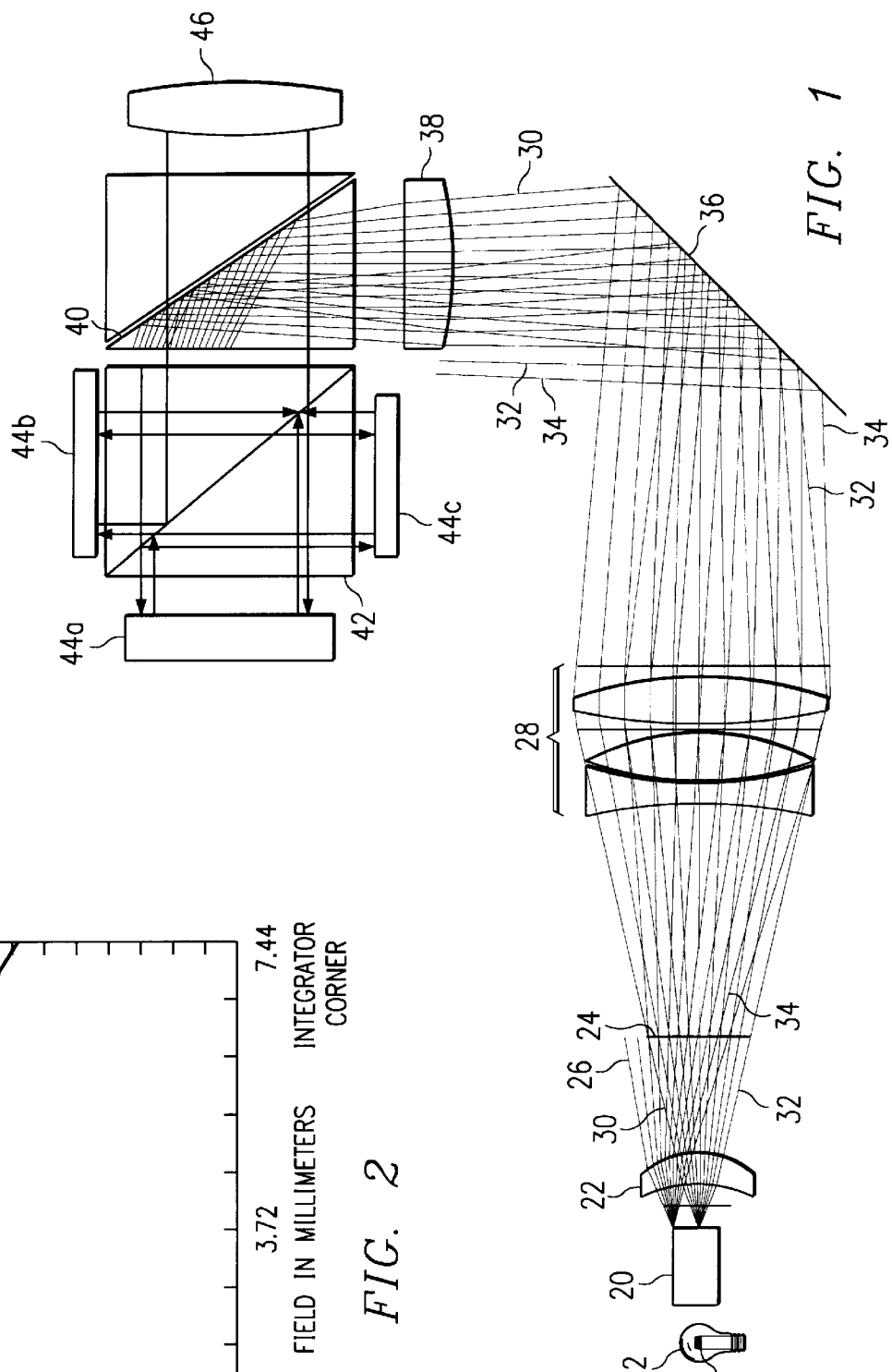
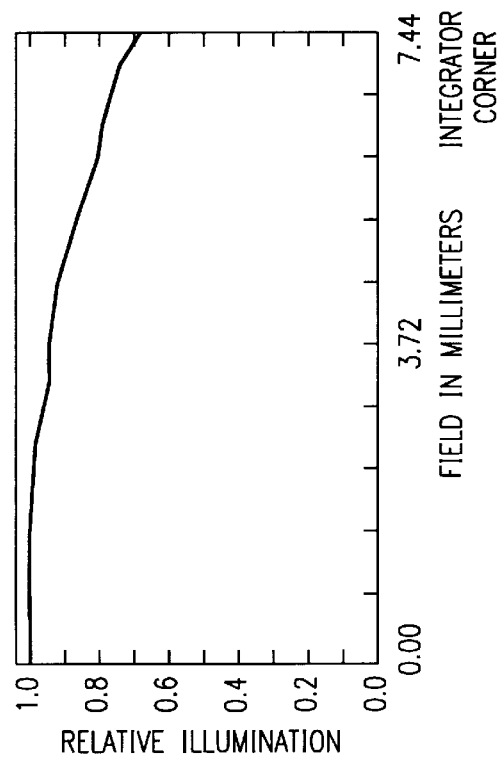

ILLUMINATION SYSTEM FOR HIGH RESOLUTION DISPLAY SYSTEMS

This application claims priority under 35 USC § 119(e)(1) of provisional application number 60/071,243 filed Jan. 12, 1998.

BACKGROUND OF THE INVENTION

1. Field of the Invention

This invention relates to optical systems, more particularly to optical systems for spatial light modulator display systems.

2. Background of the Invention

In recent years, the use of spatial light modulators for creating images in display systems has become more prevalent. The most common spatial light modulators are arranged in an x-y array of individually controlled elements, such as liquid crystal devices (LCD), or digital micromirror devices (DMD™).

Typically, these modulators have elements corresponding to each "dot" of resolution on a one-to-one ration. A VGA (640×480) resolution display would then have 480 lines of elements of 640 elements per line. As the resolution increases, the number of elements increases. Since most of these elements are of a set size, the panel containing the modulator array must get larger as well.

Higher resolution images such as SVGA (800×600), XGA (1024×768) and SXGA (1280×1024), and their correspondingly larger arrays must have larger optics. At some point, the cost and size of the optics becomes prohibitive. Larger optics may result in a degradation of performance of the optical system, with the lenses not able to achieve the required performance.

Therefore, an optical solution is needed allowing use of higher resolution, larger spatial light modulator panels.

SUMMARY OF THE INVENTION

One embodiment of the invention is an optical system for use in spatial light modulator display. The optical system includes a light source, and illumination optics for focusing light onto a modulator, which creates the image. Other embodiments include projection optics for projecting the image onto a final display surface. The optical system includes at least one aperture that vignettes the illumination, containing the path of illumination to allow smaller prisms to be used. The use of smaller prisms allows for smaller lenses to be used as well.

It is an advantage of the invention in that it allows larger spatial light modulators to be used for higher resolutions, without a corresponding increase in the size and complexity of the optics.

It is a further advantage of the invention in that it costs less and prevents optical performance degradation from correspondingly larger lenses and prisms.

BRIEF DESCRIPTION OF THE DRAWINGS

For a more complete understanding of the present invention and for further advantages thereof, reference is now made to the following Detailed Description taken in conjunction with the accompanying Drawings in which:

FIG. 1 shows one embodiment of the present invention; and

FIG. 2 shows a graph of relative illumination and the optical field for an optical system using vignetting.

DETAILED DESCRIPTION OF THE PREFERRED EMBODIMENTS

One example of a projection system using the invention is shown in FIG. 1. Light source 10 provides illumination to the spatial light modulators 44a–44c. Light from the source 10 is focused by the elliptical reflector 12 to the input of the light integrator 20. Light integrator 20 ensures uniformity of illumination for the entire optical field. The system is telecentric, with the angles of the cones of rays being symmetric and perpendicular at all points in the field. Another definition of telecentricity is that the exit and entrance pupils (images of the aperture stop) at infinity.

After passing though lens 22, the rays of light are diverging. A vignetting aperture 24 is used to frame the light to allow it to stay within the necessary path for lens group 28, which creates the images of the light integrator onto the spatial light modulator, referred to hereinafter as the integrator imaging group. In order to reduce the size of the prism and projection lens, it is desirable to reduce the angle of the cone of rays at the corner of the spatial light modulator. This vignetting could be done by the projection lens by making the lens elements smaller than necessary to pass all of the light. But, in this case, the prisms would still be large.

To reduce the cone angle at the edge of the field, aperture 24 and an aperture around lens 38 are used. Both apertures are required to keep the cone of light symmetric as it is reduced toward the edge of the field.

In this particular embodiment, a fold mirror 36 is used to fold the optical path. However, this is not a necessary part of the invention and is just used as one possible example of an optical system that would use vignetting apertures.

The second vignetting aperture is part of the lens 38, which is a field flattening lens. The aperture, in this example, is formed by the bracket which holds the lens. As can be seen, the examples of the rays which passed through the first aperture 24, rays 30, 32 and 34, may become blocked at second aperture 38. In this example rays 32 and 34 are blocked, and ray 30 continues to pass through the aperture.

After passing through the lens/aperture 38, the light passes through a TIR (total internal reflection) prism 40, which is two triangular prisms separated by an air gap, which forms the TIR interface, typically in one housing. The light path then folds into the color-splitting prism 42. In this example, the system has three reflective spatial light modulators. However, the vignetting apertures could be used with any variation on the number of modulators, and could be used with transmissive modulators as well.

Because most image data is displayed with three colors, red, green and blue, three modulators are shown here for discussion. However, it is possible to use the vignetting apertures with one modulator systems, where one modulator typically modulate light in color sequential fashion. Two modulator systems, where one modulator modulates two colors while the other only one, can also use the vignetting aperture.

In this example, the three modulators 44a, 44b and 44c, each received one color. Which color each receives is dependent upon the manufacture of the color splitting interface of the prism 42. After each modulator modulated the appropriate image data for its color, the modulated light passes back through the color-splitting prism, recombining and then through the TIR prism to projection lens 46. Projection lens 46 then transmits the combined light to a projection surface. For direct view applications, the projection lens 46 will not be necessary.

In order to keep the cone angles symmetric on the edges of the light path, it is necessary to use two vignetting apertures. With only one, it was found in experiments to cause asymmetry to occur. The end result of the optical system is to image the light coming out of the integrator onto the modulators. Using only one aperture introduced an asymmetry at the corners of the image of the integrator. It is necessary to keep the cone angles symmetric, since the prism coatings are angle sensitive and any asymmetry will cause artifacts in the final image.

One concern in using vignetting apertures is the loss of light from the blocked rays, such as those shown by ray 26. FIG. 2 shows a comparison of relative illumination verses the field size of the modulator. The field size is measured in radial distance from the center of the modulator, being styled as concentric circles from the center.

As can be seen in FIG. 2, a field size of 7.44 millimeters has a drop in illumination of 30%. However, this assumes the illumination has a uniform pupil. In reality, there is a non-uniform pupil, and the actual drop is more accurately a 10–15% drop in illumination at a field size of 7.44 mm. It is important to note that the ANSI measuring points for brightness, used in providing the brightness ratings of projectors, are much less affected by the brightness reduction at the corners. The loss of light from the blocking aperture does not necessarily have a large adverse effect on the overall system performance.

An added benefit of the vignetting apertures is that they allow tailoring of the illumination profile, an example of which is shown in FIG. 2. By moving the apertures either closer together, or farther apart, the roll off of the curve shown in FIG. 2 can be made much more steep or much more flat. This allows flexibility in the optical design, as well as serving the purpose of limiting the necessary size of the optics.

The use of the vignetting aperture allows optics that are only slightly larger to be used for larger arrays, and does not significantly affect the system brightness. Additionally, the apertures could be integrated into the lens brackets, preventing any increase in complexity of the system.

The apertures themselves are some type of nontransmissive material. They can either absorb or reflect the incident light. The key feature is that they only allow light to pass that is within the aperture. Examples include metal, either reflective or not, and black plastic or rubber that would absorb the light without getting overheated.

Thus, although there has been described to this point a particular embodiment for a method and structure for an optical system used in high resolution image display, it is not intended that such specific references be considered as limitations upon the scope of this invention except in-so-far as set forth in the following claims.

What is claimed is:

1. A telecentric optical system for a spatial light modulator display system, comprising:
   a. a light source;
   b. a light integrator operable to uniformly distribute light from said source;
   c. a first vignetting aperture operable to frame light from said integrator to maintain uniform illumination and eliminate stray light from said optical system;
   d. an integrator imaging lens group operable to received said light from said first vignetting aperture, thereby producing color-corrected light;
   e. a second vignetting aperture operable to further frame said color-corrected light and to maintain symmetry of the illumination light bundle; and
   f. at least one spatial light modulator operable to receive said color-corrected and framed light.

2. The optical system of claim 1, wherein said at least one spatial light modulator comprises three spatial light modulators, one each for red, green and blue light.

3. The optical system of claim 2, wherein said red, green and blue light is produced by a color-splitting prism.

4. The optical system of claim 1, wherein said at least one spatial light modulator comprises two spatial light modulators.

5. The optical system of claim 1, wherein said optical system further comprises a projection lens operable to receive light from said at least one spatial light modulator.

6. The optical system of claim 1, wherein said first aperture is a separate component of said system.

7. The optical system of claim 1, wherein said first aperture is integrated into a lens bracket.

8. The optical system of claim 1, wherein said second aperture is a separate component of said system.

9. The optical system of claim 1, wherein said second aperture is integrated into a lens bracket.

10. The optical system of claim 1, wherein positions for said apertures are adjustable to create a tailored illumination profile.

\* \* \* \* \*